US010257556B2

(12) United States Patent
Goetz et al.

(10) Patent No.: US 10,257,556 B2
(45) Date of Patent: *Apr. 9, 2019

(54) STREAMING MEDIA AUTHORIZATION BASED ON CALL SIGNS

(71) Applicant: Amazon Technologies, Inc., Seattle, WA (US)

(72) Inventors: Jeromey Russell Goetz, Seattle, WA (US); Christopher Shingee Park, Issaquah, WA (US); Varadarajan Gopalakrishnan, Cupertino, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/782,113

(22) Filed: Oct. 12, 2017

(65) Prior Publication Data

US 2018/0035146 A1    Feb. 1, 2018

Related U.S. Application Data

(63) Continuation of application No. 14/738,229, filed on Jun. 12, 2015, now Pat. No. 9,832,502.

(51) Int. Cl.
*H04N 7/16* (2011.01)
*H04N 21/266* (2011.01)
(Continued)

(52) U.S. Cl.
CPC ......... *H04N 21/266* (2013.01); *H04H 60/14* (2013.01); *H04H 60/51* (2013.01); *H04N 21/4524* (2013.01); *H04H 60/50* (2013.01)

(58) Field of Classification Search
CPC .................. H04N 21/266; H04N 21/4524
(Continued)

(56) References Cited

U.S. PATENT DOCUMENTS 7,676,219 B2 * 3/2010 Williams ............ H04L 63/0492
380/258
8,255,378 B2 * 8/2012 Ji ..................... H04H 60/70
707/706

(Continued)

OTHER PUBLICATIONS

U.S. Appl. No. 14/738,229, filed Jun. 12, 2015, Notice of Allowance dated Aug. 3, 2017.

(Continued)

*Primary Examiner* — Michael B. Pierorazio
(74) *Attorney, Agent, or Firm* — Thomas Horstemeyer, LLP

(57) ABSTRACT

Disclosed are various embodiments for determining whether a client device is authorized to receive media content based at least in part on the call signs of broadcast stations that the client device is able to receive. A computing device receives a broadcast station identifier and a program identifier from a client computing device. The computing device determines that the client computing device is authorized to access media content identified by the program identifier based at least in part on the broadcast station identifier. Finally, the computing device streams the media content to the client computing device in response to determining that the client computing device is authorized to access the media content.

20 Claims, 5 Drawing Sheets

(51) Int. Cl.
  *H04H 60/14* (2008.01)
  *H04H 60/51* (2008.01)
  *H04N 21/45* (2011.01)
  *H04H 60/50* (2008.01)

(58) Field of Classification Search
  USPC ............................................................. 725/25
  See application file for complete search history.

(56) References Cited

U.S. PATENT DOCUMENTS

| | | | | |
|---|---|---|---|---|
| 8,370,872 | B1* | 2/2013 | Sun | H04N 21/41407 725/38 |
| 8,737,990 | B2* | 5/2014 | Moreillon | G06F 21/10 455/434 |
| 2003/0097408 | A1* | 5/2003 | Kageyama | H04L 12/1818 709/205 |
| 2003/0192054 | A1* | 10/2003 | Birks | H04N 7/17336 725/100 |
| 2003/0233580 | A1* | 12/2003 | Keeler | G06Q 20/206 726/7 |
| 2005/0097593 | A1* | 5/2005 | Raley | G06Q 30/02 725/14 |
| 2006/0064734 | A1* | 3/2006 | Ma | H04N 5/44582 725/136 |
| 2006/0253560 | A1* | 11/2006 | Aaltonen | H04H 60/06 709/223 |
| 2007/0067807 | A1* | 3/2007 | O'Neil | H04N 7/17318 725/62 |
| 2007/0067817 | A1* | 3/2007 | Hamilton | H04L 63/08 725/100 |
| 2007/0107022 | A1* | 5/2007 | Lawrence, III | H04H 60/37 725/92 |
| 2007/0157234 | A1* | 7/2007 | Walker | H04N 5/44543 725/38 |
| 2007/0157240 | A1* | 7/2007 | Walker | H04N 21/4334 725/46 |
| 2007/0157241 | A1* | 7/2007 | Walker | H04N 5/782 725/46 |
| 2007/0157260 | A1* | 7/2007 | Walker | H04N 7/163 725/86 |
| 2007/0237330 | A1* | 10/2007 | Srivastava | H04N 7/17318 380/212 |
| 2007/0240192 | A1* | 10/2007 | Acharya | H04N 7/17318 725/87 |
| 2008/0005770 | A1* | 1/2008 | Acharya | H04N 5/76 725/101 |
| 2008/0060035 | A1* | 3/2008 | Tsang | H04L 12/18 725/109 |
| 2008/0141303 | A1* | 6/2008 | Walker | H04N 21/4334 725/39 |
| 2008/0184326 | A1* | 7/2008 | Nakajima | H04N 5/782 725/133 |
| 2008/0201225 | A1* | 8/2008 | Maharajh | G06F 17/30035 705/14.43 |
| 2008/0216107 | A1* | 9/2008 | Downey | H04N 7/17318 725/22 |
| 2008/0235733 | A1* | 9/2008 | Heie | H04N 7/163 725/46 |
| 2008/0270725 | A1* | 10/2008 | Roden | H04N 5/765 711/165 |
| 2008/0307478 | A1* | 12/2008 | Kim | H04L 65/605 725/114 |
| 2010/0180305 | A1* | 7/2010 | Migos | H04N 5/44543 725/45 |
| 2010/0199316 | A1* | 8/2010 | Clarniello | H04H 60/91 725/62 |
| 2010/0296487 | A1* | 11/2010 | Karaoguz | H04W 84/045 370/332 |
| 2011/0086619 | A1* | 4/2011 | George | H04M 1/72533 455/414.1 |
| 2011/0119595 | A1* | 5/2011 | Bydeley | H04N 21/44213 715/738 |
| 2011/0137592 | A1* | 6/2011 | Kim | G01R 21/1338 702/62 |
| 2011/0196983 | A1* | 8/2011 | Goodmon | H04H 60/51 709/231 |
| 2011/0279311 | A1* | 11/2011 | Hamano | G06F 17/30241 342/357.25 |
| 2011/0298596 | A1* | 12/2011 | Warrick | G06F 21/305 340/12.53 |
| 2011/0302607 | A1* | 12/2011 | Warrick | H04L 12/2809 725/39 |
| 2012/0127374 | A1* | 5/2012 | Kanojia | H04H 20/57 348/731 |
| 2012/0174150 | A1* | 7/2012 | Reddy | H04N 21/25841 725/31 |
| 2012/0266201 | A1* | 10/2012 | Kanojia | H04N 21/2181 725/109 |
| 2013/0127665 | A1* | 5/2013 | Miller | H01Q 1/1257 342/359 |
| 2013/0198787 | A1* | 8/2013 | Perry, II | H04N 21/25816 725/86 |
| 2013/0276017 | A1* | 10/2013 | Walker | H04N 21/44204 725/25 |
| 2014/0096163 | A1* | 4/2014 | Perry, II | H04N 7/106 725/74 |
| 2015/0230004 | A1* | 8/2015 | VanDuyn | H04N 21/6334 725/27 |

OTHER PUBLICATIONS

U.S. Appl. No. 14/738,229, filed Jun. 12, 2015, Response to Non-Final Office Action dated Apr. 5, 2017.
U.S. Appl. No. 14/738,229, filed Jun. 12, 2015, Non-Final Office Action dated Apr. 5, 2017.
U.S. Appl. No. 14/738,229, filed Jun. 12, 2015, Response to Final Office Action dated Oct. 6, 2016.
U.S. Appl. No. 14/738,229, filed Jun. 12, 2015, Final Office Action dated Oct. 6, 2016.
U.S. Appl. No. 14/738,229, filed Jun. 12, 2015, Response to Non-Final Office Action dated Apr. 15, 2016.
U.S. Appl. No. 14/738,229, filed Jun. 12, 2015, Non-Final Office Action dated Apr. 15, 2016.

* cited by examiner

STREAMING MEDIA AUTHORIZATION BASED ON CALL SIGNS

CROSS-REFERENCE TO RELATED APPLICATIONS

This application is a continuation of U.S. patent application Ser. No. 14/738,229, titled "Streaming Media Authorization Based on Call Signs," filed Jun. 12, 2015, the entire disclosure of which is hereby fully incorporated herein by reference.

BACKGROUND

Limits are often placed on the transmission of media content. Transmission of media content may, for example, be limited or restricted based on geography. As an example, restrictions may be placed on broadcasting televised athletic events, such as football or baseball games, within a certain radius of the hosting team's venue based on ticket sales or other factors (i.e. "blackouts") while no restrictions may be placed on broadcasting the athletic event outside the radius.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Disclosed are various embodiments for determining a location of a client computing device and determining whether the client computing device is authorized to receive geographically restricted streaming media content based upon the location. The client computing device may, for example, include an antenna that can receive broadcast signals such as digital television or radio signals. The client computing device can decode the received signals to determine the call signs of the broadcasting television or radio stations. The client computing device can then use the identified call signs to determine whether it is in a location where it is authorized to receive geographically restricted streaming media content. For example, if the client computing device determines that it is receiving television signals from KOMO, then the client computing device can determine that is within metropolitan Seattle and/or the Seattle designated market area (DMA). Similarly, if the client computing device determines that it is receiving television signals from KOMO, then the client computing device may also determine that it is not in another geographic region or media market, such as Dallas, Atlanta, New York City, Boston, or other regions. The client computing device may then be restricted from streaming content that is geographically restricted to the Dallas, Atlanta, New York City, and/or Boston media markets.

In a similar embodiment, the client computing device may decode the received signals and determine the call signs of the broadcasting television or radio stations. The client computing device may then submit these call signs to a remote computing device when the client computing device requests geographically restricted media content from the remote computing device. The remote computing device in turn determines whether client computing device is permitted to receive the requested geographically restricted media content based on the call signs submitted with the request. If the client computing device is authorized, the remote computing device begins streaming the geographically restricted media content. In the following discussion, a general description of the system and its components is provided, followed by a discussion of the operation of the same.

Figure 1:
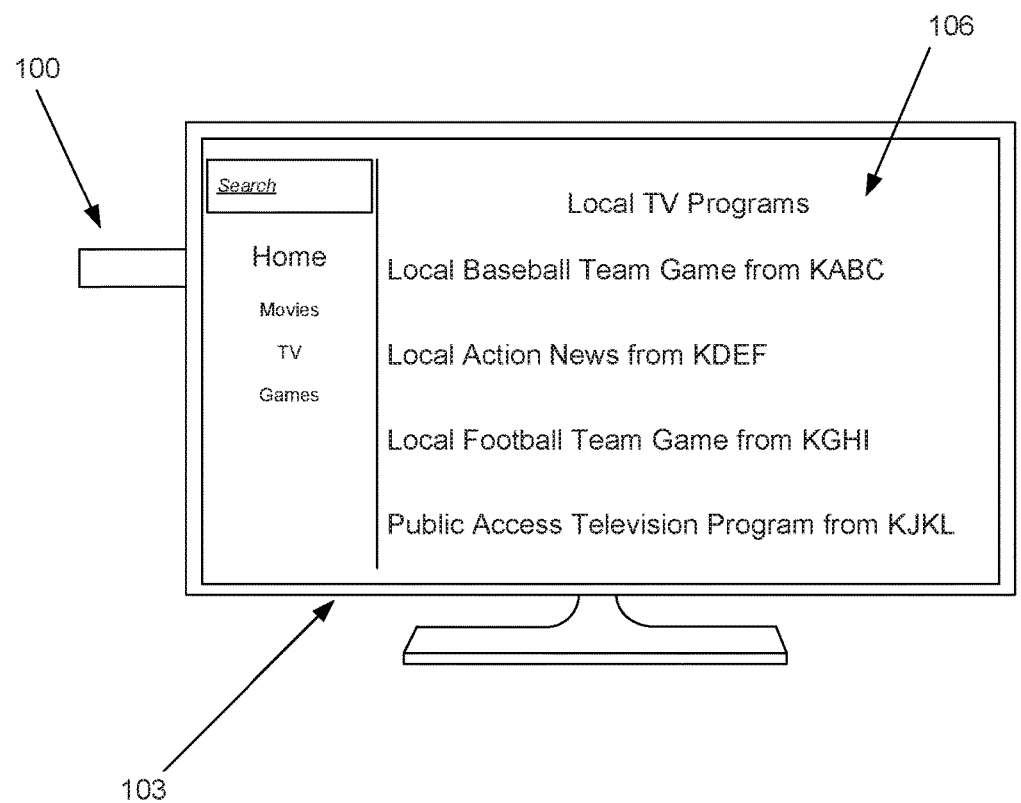
FIG. 1 is a drawing representing an implementation of the various embodiments of the present disclosure.

With reference to FIG. 1, shown is a client computing device 100 attached to a display 103. The client computing device 100 may include, for example, any computing device capable of receiving and rendering media content, including streaming media content received over a network. Examples of client computing devices 100 include laptop computers, desktop computers, mobile computing devices (e.g. cellular phones, smart phones, tablets, slate, and/or similar devices), digital media players (e.g. Amazon's FireTV® and FireTV Stick®, Google's Chromecast®, Apple TV®, Roku Streaming Player®, SlingBox®, and similar digital media players), set-top boxes, cable boxes, game consoles, and similar devices such as those described in further detail herein. Examples of a display 103 include televisions and computer monitors, as further described herein. In some embodiments, the display 103 may be integrated with the client computing device 100, such as "all-in-one" computers, laptop computers, "smart TV's," and/or similar devices.

Rendered on the display 103 is a user interface 106. The user interface 106 lists a number of programs available for streaming based on the call sign corresponding to television signals received by the client computing device 100. As an illustrative example, a user can stream the "Local Baseball Team Game" because the client computing device 100 is currently receiving television signals from the KABC station. Similarly, a user can stream the "Local Action News" because the client computing device 100 is currently receiving television signals from the KDEF station.

Figure 2:
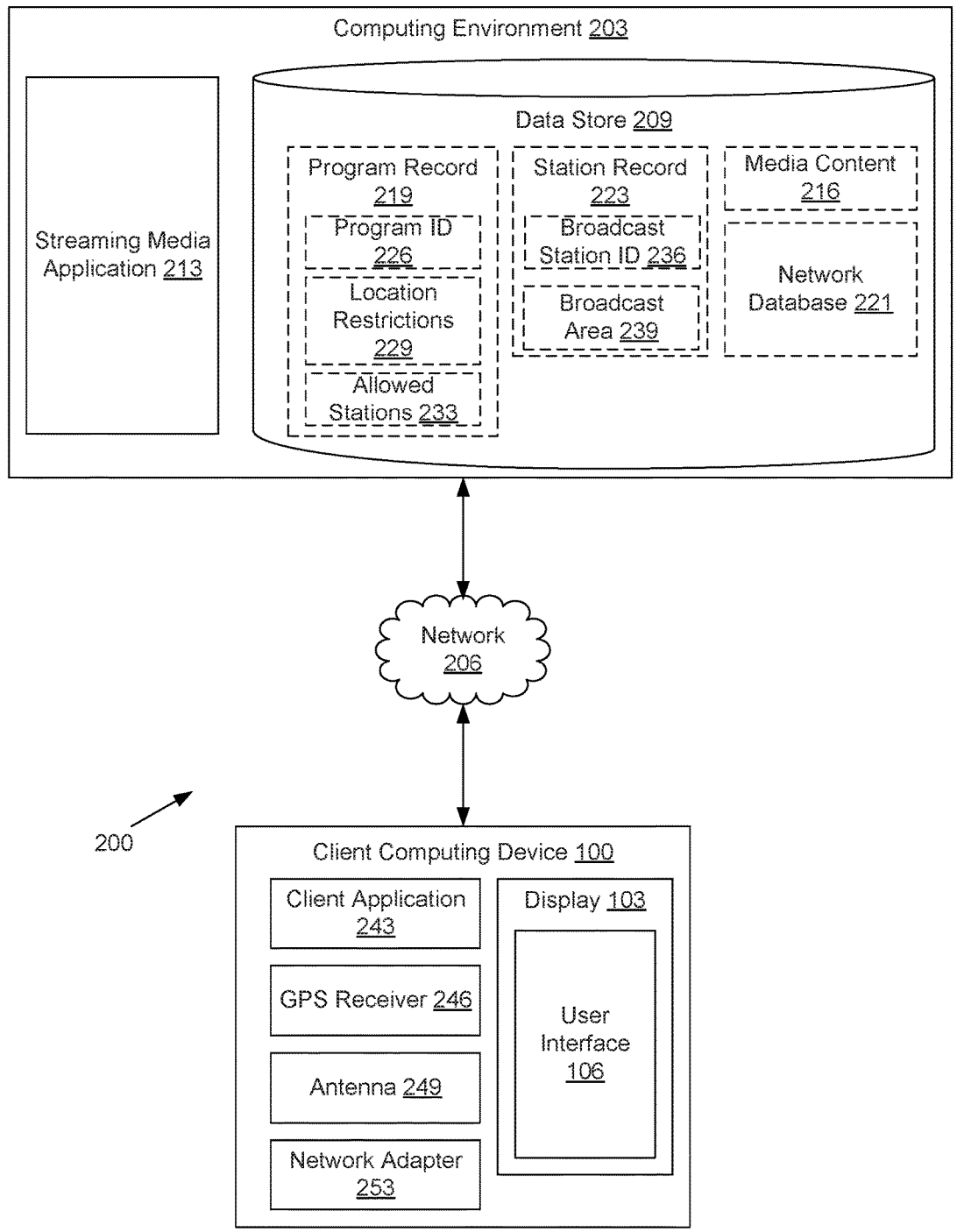
FIG. 2 is a drawing of a networked environment according to various embodiments of the present disclosure.

With reference to FIG. 2, shown is a networked environment 200 according to various embodiments. The networked environment 200 includes a computing environment 203, a client device 100, and potentially other devices, which are in data communication with each other via a network 206. The network 206 includes, for example, the Internet, intranets, extranets, wide area networks (WANs), local area networks (LANs), wired networks, wireless networks, or other suitable networks, etc., or any combination of two or more such networks. For example, such networks may comprise satellite networks, cable networks, Ethernet networks, and other types of networks.

The computing environment 203 may comprise, for example, a server computer or any other system providing computing capability. Alternatively, the computing environment 203 may employ a plurality of computing devices that may be arranged, for example, in one or more server banks, computer banks or other arrangements. Such computing devices may be located in a single installation or may be distributed among many different geographical locations. For example, the computing environment 203 may include a plurality of computing devices that together may comprise a hosted computing resource, a grid computing resource and/or any other distributed computing arrangement. In some cases, the computing environment 203 may correspond to an elastic computing resource where the allotted capacity of processing, network, storage, or other computing-related resources may vary over time.

Various applications and/or other functionality may be executed in the computing environment 203 according to various embodiments. Also, various data is stored in a data store 209 that is accessible to the computing environment 203. The data store 209 may be representative of a plurality of data stores 209 as can be appreciated. The data stored in the data store 209, for example, is associated with the operation of the various applications and/or functional entities described below.

The components executed on the computing environment 203, for example, include a streaming media application 213 and other applications, services, processes, systems, engines, or functionality not discussed in detail herein. The streaming media application 213 is executed to stream media content 216 to client computing devices 100, determine or verify whether a client computing device 100 is authorized to receive the streaming media content 216, and/or potentially perform other functions.

The data stored in the data store 209 includes, for example, media content 216, program records 219, a network database 221, station records 223, and potentially other data. Each program record 219 may include a program identifier 226, a list of location restrictions 229, a list of allowed stations 233, and potentially other data. Each station record 223 may include a broadcast station identifier 236, a broadcast area 239, and potentially other data.

Media content 216 may represent digital media that can be transmitted or sent (i.e. "streamed") to a client computing device 100 over a network 206. Digital media may include audio and/or video media, such as music, podcasts, radio broadcasts, television broadcasts, television shows, movies, and/or other audio or video content.

A program record 219 may represent metadata for media content 216. As such, each item or instance of media content 216 may have a corresponding program record 219. A program record 219 may include a program identifier 226, which represents a unique identifier for a program record 219 and therefore the corresponding item or instance of media content 216. A program identifier 226 may correspond to a serial number, unique file name, and/or other unique identifier. A program record 219 may also include a list of location restrictions 229, which may identify geographic areas in which a client computing device 100 is allowed to receive media content 216 or may identify geographic areas in which a client computing device 100 is not allowed to receive media content 216, according to various embodiments of the present disclosure. A program record 219 may also include a list of allowed stations 233. The list of allowed stations 233 may include a list of broadcast station identifiers 236 which, if supplied by the client computing device 100, indicate that the client computing device 100 is allowed to receive media content 216.

A network database 221 may represent a list of networks associated with a particular geographic area or location. For example, individual Wi-Fi networks may share the same service set identifier (SSID). However, the number of available Wi-Fi networks at a particular location and the combination of SSIDs of the available Wi-Fi networks is often unique for a particular location. The network database 221 may, therefore, represent a mapping of combinations of SSIDs of Wi-Fi networks to particular geographic locations or areas. In some instances, the network database 221 may also store media access control (MAC) address for network cards associated with the Wi-Fi networks available to the client computing device 100. Because each network card has a unique MAC address, if the location of particular MAC address for a Wi-Fi network is known, the location of the client computing device 100 can be presumed to be near the Wi-Fi network. Similarly, cellular phone transmission towers have a limited transmission range. Accordingly, there are a limited number of areas where a client computing device 100 may be able to receive a transmission from a particular cellular phone tower or set of cellular phone towers. This information may be similarly mapped in the network database 221.

A station record 223 may represent a broadcast station, such as a television or radio station. Each station record 223 may include a broadcast station identifier 236 that uniquely identifies the broadcast station. Examples of broadcast station identifiers 236 include International Telecommunications Union (ITU) call signs assigned to broadcast stations by the Federal Communications Commission (FCC), such as WABC, KDEF, WGHI-AM, WGHI-FM, KJKL-TV, etc. A station record 223 may also include a broadcast area 239 representing the geographic region or area in which signals from the broadcast station may be received.

The client computing device 100 is representative of a plurality of client devices that may be coupled to the network 206. The client computing device 100 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability including those previously described with respect to FIG. 1. The client computing device 100 may include a display 103 and/or be connected to a display 103. The display 103 may comprise, for example, one or more devices such as televisions, computer monitors, and/or similar screens using various display technologies such as liquid crystal display (LCD) displays, gas plasma-based flat panel displays, organic light emitting diode (OLED) displays, electrophoretic ink (E ink) displays, LCD projectors, or other types of display devices, etc.

The client computing device 100 may be configured to execute various applications such as a client application 243 and/or other applications. The client application 243 may be executed in a client computing device 100, for example, to access media content 216 and/or other network content served up by the computing environment 203 and/or other servers, thereby rendering a user interface 106 on the display 103. To this end, the client application 243 may comprise, for example, a browser, a dedicated media playback application, etc., and the user interface 106 may comprise a network page, an application screen, etc. The client computing device 100 may be configured to execute applications beyond the client application 243 such as, for example, email applications, social networking applications, word processors, spreadsheets, video games, and/or other applications.

The display 103 may be integrated with the client computing device 100 or externally connected to the client computing device 100. For example, where the client computing device 100 is a smart television or an all-in-one computer would have an integrated display 103. However, the display 103 may also be connected to the client computing device 100 through a number of physical or wireless connections. For example, the display 103 may be connected to the client computing device 100 via a high-definition media interface (HDMI) connection, a DisplayPort® connection, or similar wired connection. As another example, the display 103 could be wirelessly connected to the client computing device 100 via a wireless HDMI transmitter, a Wi-Fi network connection, a BlueTooth® connection, or similar wireless connection.

The client computing device 100 may also include a global positioning system (GPS) receiver 246, an antenna 249, and a network adapter 253 in addition to the processor, memory, display 103, and other circuitry of the client computing device 100. The GPS receiver 246 may be used to identify the current position of the client computing device 100 by determining the current latitude and longitude coordinates of the client computing device 100.

The antenna 249 is configured to receive radio and/or television broadcast transmissions. In various embodiments, the antenna 249 may be miniaturized, such that the antenna 249 is large enough to receive a signal that can be decoded in order to determine the call signs of stations in proximity to the client computing device 100, but small enough to placed internally within the client computing device 100. In some embodiments, the antenna 249 may be located remotely from the client computing device 100, such as where the antenna 249 is mounted on the outside of a house or where an antenna 249 is located in another room from the client computing device 100 in order to receive a better signal. In such instances, the antenna 249 may be physically connected to the client computing device 100 with a cable or may wirelessly transmit any received signals to the client computing device 100 using various approaches.

The network adapter 253 may be used to connect to the client computing device 100 to the network 259. The network adapter 253 can include any type of network interface, such as an Ethernet adapter, a Wi-Fi adapter, a cellular receiver, or other adapter.

Next, a general description of the operation of the various components of the networked environment 200 is provided. To begin, the client computing device 100 receives one or more broadcast signals, such as television or radio signals, using its antenna 249. The client application 243 decodes the broadcast signals to identify the call sign of the station transmitting the broadcast signal embedded in the metadata of the broadcast signal.

The client application 243 then submits a request to stream media content 216 from the computing environment 203. As part of this request, the client application 243 may include the call signs it has decoded from the broadcast signals and a program identifier 226 to identify a program record 219 associated with the requested media content 216. In some embodiments, the request may include a set of coordinates generated by the GPS receiver 246 in place or in addition to the call signs. In various embodiments, the client application 243 may also submit other location identification data, such as a list of wireless networks within range of the client computing device 100 or a list of cellular phone towers within range of the client computing device 100.

The streaming media application 213 then determines whether the client computing device 100 is authorized to receive the requested media content 216. The streaming media application 213 may, for example, determine whether a program record 219 includes any location restrictions 229 and/or has a list of allowed stations 233 associated with the program record 219. If there are no location restrictions 229 and/or the call signs provided by the client computing device 100 may be included in the list of allowed stations 233, then the media content 216 is sent to the client computing device 100. However, if locations restrictions 229 are specified, the streaming media application 213 may determine whether the current location of the client computing device 100 is within a restricted area. For example, the streaming media application 213 may compare the coordinates supplied by the client computing device 100 to the area defined by the location restrictions 229 to determine whether the current location of the client computing device 100 is a location in which the client computing device 100 is unauthorized to receive the media content 216. As another example, the streaming media application 213 may use the call signs provided by the client computing device 100 to approximate the position of the client computing device 100. For example, if a client computing device 100 is able to receive transmissions from stations located in both Portland, Oreg. and Seattle, Wash., then the streaming media application 213 may determine that the client computing device 100 is in a location north of Portland and south of Seattle and then compare this approximate location with the areas specified in the location restrictions 229. Finally, if the none of the call signs provided by the client computing device 100 appear in the list of allowed stations 233, the streaming media application 213 will determine that the client computing device 100 is not in an area where the client computing device 100 is authorized to receive the media content 216 corresponding to the program identifier 226.

After determining that the client computing device 100 is in a location where the client computing device 100 is authorized to receive the media content 216, the streaming media application 213 sends the media content 216 to the client computing device 100. The client computing device 100 then renders the media content 216. Video content, for example, may be rendered within the user interface 106 of the display 103.

In some embodiments, the streaming media application 213 may determine whether the broadcast signal received with the antenna 249 corresponds to content encoded in standard definition (e.g. a 480i NTSC encoded signal or a PAL encoded signal) or in high-definition (e.g. a 720p, 1080i, or 1080p encoded signal). For example, a digital television broadcast signal capable of broadcasting high-definition television content may be transmitting older video content encoded using the older standard definition format, such as an older movie or television program. In these embodiments, the streaming media application 213 may, for example, convert the media content 216 to be streamed to the client computing device 100 to match the resolution of the content being received by the client computing device 100. For example, if a client computing device 100 is receiving a standard definition movie on a high-definition television channel, the client computing device 100 may convert the media content 216 from high-definition to standard definition prior to streaming.

Figure 3:
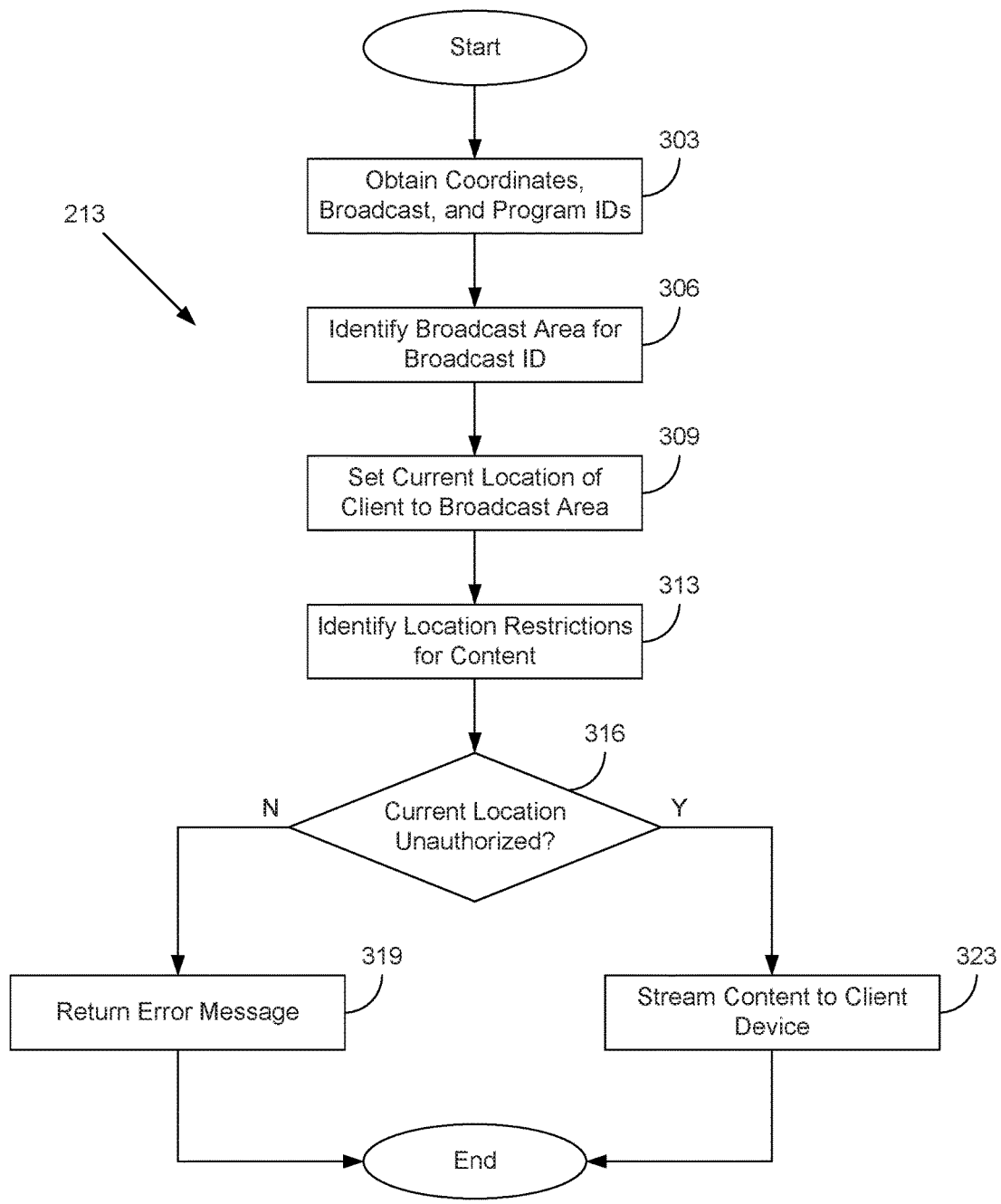
FIG. 3 is a flowchart illustrating one example of functionality implemented as portions of an application executed in a computing environment in the networked environment of FIG. 2 according to various embodiments of the present disclosure.

Referring next to FIG. 3, shown is a flowchart that provides one example of the operation of a portion of the streaming media application according to various embodiments. It is understood that the flowchart of FIG. 3 provides merely an example of the many different types of functional arrangements that may be employed to implement the operation of the portion of the streaming media application 213 as described herein. As an alternative, the flowchart of FIG. 3 may be viewed as depicting an example of elements of a method implemented in the computing environment 203 (FIG. 2) according to one or more embodiments.

Beginning with box 303, the streaming media application 213 may obtain the coordinates identifying the current location of the client computing device 100, one or more broadcast identifiers 236 (FIG. 2) of stations whose transmissions the client computing device 100 (FIG. 2) is able to receive, and one or more program identifiers 226 (FIG. 2) identifying media content 216 (FIG. 2) to be sent to the client computing device 100. The coordinates, broadcast identifiers 236, and program identifiers 226 may be obtained, for example, when a request for media content including this information is received from the client computing device 100.

Moving on to box 306, the streaming media application 213 may determine a broadcast area 239 (FIG. 2) corresponding to each broadcast identifier 236 previously obtained in box 303. The streaming media application 213 may, for example, query a station record 223 (FIG. 2) located in the data store 209 (FIG. 2) using the corresponding broadcast identifier 236 in order to retrieve the broadcast area 239 stored in the station record 223.

Proceeding next to box 309, the streaming media application 213 uses the identified broadcast areas 239 to determine the current location of the client computing device 100. In the event that only a single broadcast identifier 236 was provided, the location of the client computing device 100 may be noted as being somewhere within the broadcast area 239 corresponding to the broadcast identifier 236. When multiple broadcast identifiers 236 are provided, the streaming media application 213 may retrieve multiple broadcast areas 239 and note the location of the client computing device 100 as being within the area where all of the broadcast areas 239 overlap—which is presumably a smaller area than that defined by any single broadcast area 239. However, in embodiments where the client computing device 100 is equipped with a GPS receiver 246 (FIG. 2), the streaming media application 213 may use the coordinates supplied by the client computing device 100 to determine the current location of the client computing device 100 instead of, or in addition to, mapping the broadcast areas 239 as outlined above. In embodiments where the client computing device 100 has submitted a list of wireless networks within range of the client computing device 100, the streaming media application 213 may be able to map the potentially unique combination of wireless network service set identifier (SSID) names to an approximate location. Similarly, if the client computing device 100 submitted a list of cellular phone towers within range of the client computing device 100, the streaming media application 213 may be able to triangulate or otherwise approximate the position of the client computing device 100.

Referring next to box 313, the streaming media application 213 determines the areas in which the client computing device 100 is unauthorized to access the requested media content 216. For example, the streaming media application 213 may retrieve the list of location restrictions 229 and the list of allowed stations 233 (FIG. 2) included in the program record 219 identified by the program identifier 226.

Moving on to box 316, the streaming media application 213 determines whether the client computing device 100 is authorized to receive the media content 216 at its current location. This may be accomplished using any one of the following approaches or a combination of one or more of the following approaches.

First, the streaming media application 213 may determine whether the current location of the client computing device 100 falls within one of the areas defined in the list of location restrictions 229. For example, the streaming media application 213 may determine whether the area defined by the intersection of the broadcast areas 239, as previously determined at box 309, overlaps or falls within one or more of the areas identified in the list of location restrictions 229. If an overlap is detected, then the streaming media application 213 may determine that the client computing device 100 is unauthorized to receive the media content 216 at the current location of the client computing device 100.

As another example, the streaming media application 213 may determine whether the coordinates supplied by the client computing device 100 fall within at least one area identified in the list of location restrictions 229. If the coordinates fall within at least one restricted area, then the streaming media application 213 determines that the client computing device 100 is unauthorized to receive the media content 216 in the current location of the client computing device 100.

However, some embodiments may instead use the list of location restrictions 229 to represent where the client computing device 100 is authorized to receive the media content 216. In such embodiments, if the current location of the client computing device 100 falls within one of the areas defined in the list of location restrictions 229, then this may indicate that the client computing device 100 is authorized to receive the media content 216.

As another example, the streaming media application 213 may determine whether one or more of the broadcast station identifiers 236 supplied by the client computing device 100 are included in the list of allowed stations 233. If at least one of the broadcast station identifiers 236 is included in the list of allowed stations 233, then the streaming media application 213 may determine that the client computing device 100 is in an area where the client computing device 100 is authorized to receive the media content 216. If none of the broadcast station identifiers 236 are included in the list of allowed stations 233, then the streaming media application 213 may determine that the client computing device 100 is outside of an area where it is authorized to receive the media content 216.

Subsequent to box 316, the previously described path of execution proceeds along one of two paths. If the streaming media application 213 determines that the client computing device 100 is not authorized to receive the requested media content 216, then execution proceeds to box 319, where the streaming media application 213 sends an error message to the client computing device 100. The error message may include information indicating that the client computing device 100 is unauthorized to receive the requested media content 216 due to the current location of the client computing device 100. The previously described path of execution subsequently ends.

However, if the streaming media application 213 determines that the client computing device 100 is authorized to receive the requested media content 216, then execution proceeds to box 323, where the streaming media application 213 sends the requested media content 216 to the client computing device. As part of this process, the streaming media application 213 may convert the digital media content 216 to a format and/or resolution appropriate for the bandwidth of the network connection between the computing environment 203 and the client computing device 100. The previously described path of execution subsequently ends.

Figure 4:
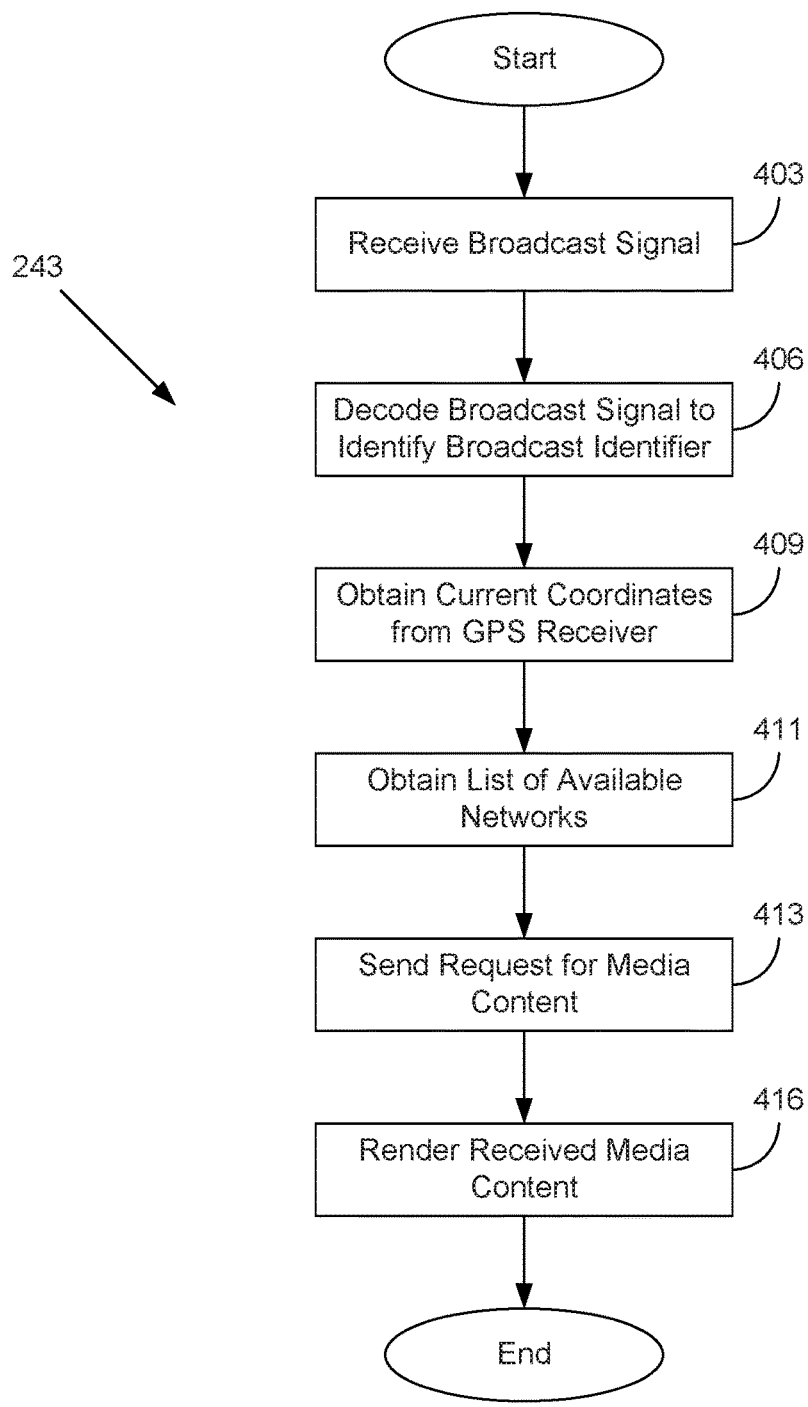
FIG. 4 is a flowchart illustrating one example of functionality implemented as portions of an application executed in a computing environment in the networked environment of FIG. 2 according to various embodiments of the present disclosure.

Referring next to FIG. 4, shown is a flowchart that provides one example of the operation of a portion of the client application 243 according to various embodiments. It is understood that the flowchart of FIG. 4 provides merely an example of the many different types of functional arrangements that may be employed to implement the operation of the portion of the client application 243 as described herein. As an alternative, the flowchart of FIG. 4 may be viewed as depicting an example of elements of a method implemented in the computing environment 203 (FIG. 2) according to one or more embodiments.

Beginning with box 403, the client application 243 receives a copy of the broadcast signal captured by the antenna 249 (FIG. 2) of the client computing device 100 (FIG. 2). The broadcast signal may, for example, be captured by the antenna 249 and stored in a memory of the client computing device 100 for the client application 243 to process.

Moving on to box 406, the client application 243 decodes the broadcast signal to identify a broadcast station identifier 236 embedded in the broadcast signal. The client application 243 may, for example, process the signal to identify metadata portions of the signal from content portions of the signal and extract the broadcast station identifier 236 from the metadata portion of the broadcast signal.

Proceeding next to box 409, the client application 243 requests or otherwise obtains a set of coordinates from the GPS receiver 246 (FIG. 2) of the client computing device 100. The coordinates may be generated periodically (e.g., every millisecond, every second, every minute, or other interval) by the GPS receiver 246 or may be generated in response to receiving a request from the client application 243.

Moving on to box 411, the client application 243 may generate a list of wireless networks available to the client computing device 100. For example, the client application 243 may query the network adapter 253 (FIG. 1) to identify a list of Wi-Fi networks available to the network adapter 253. Although individual Wi-Fi networks may share the same service set identifier (SSID), the number of available Wi-Fi networks at a particular location and the combination of SSIDs of the available Wi-Fi networks is often unique for a particular location. For example, there can be many locations in the United States where a Wi-Fi network with the SSID of "Free WiFi" is available. However, the geographic area in the United States, for example, having the same set of Wi-Fi networks with SSID's of "Free WiFi," "Company A WiFi," "Company A Guest," "Company B WiFi," and "Home WiFi" may be small enough to be useful for approximating the location of a client computing device 100. Similarly, the number of locations in the United States or the world where the network adapter 253 of the client computing device 100 is able to receive a signal from a particular set of cellular phone towers may be limited to a particular geographic area. If the client computing device 100 is able to identify the MAC addresses of the available Wi-Fi networks, then the client computing device 100 may include these as well.

Referring next to box 413, the client application 243 generates a request for media content 216 (FIG. 2) and sends the request for media content 216 to the streaming media application 213 (FIG. 2) executing in the computing environment 203 (FIG. 2). The request may include one or more of the broadcast station identifiers 236 identified previously at box 406 and/or the coordinates obtained previously at box 409. The request may also include program identifier 226 (FIG. 2) identifying the media content 216 and the program record 219 (FIG. 2) for the media content 216.

Moving on to box 416, assuming that the client computing device 100 has been authorized to receive the requested media content 216, the client application 243 causes the requested media content 216 to be rendered by the client computing device 100. For example, the client application 243 may cause video content to be rendered on the display 103 (FIG. 2) of the client computing device 100.

Figure 5:
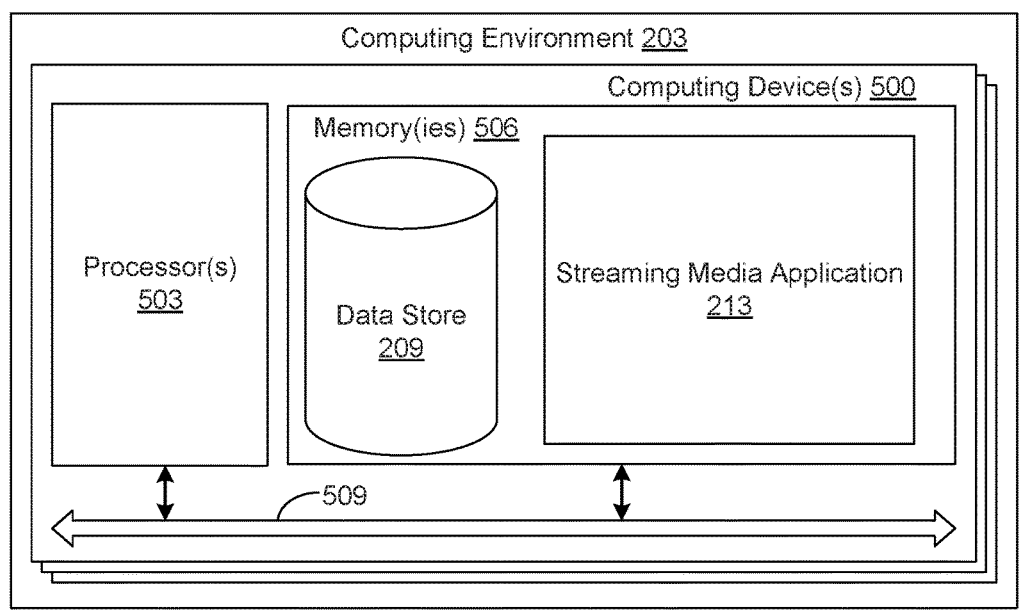
FIG. 5 is a schematic block diagram that provides one example illustration of a computing environment employed in the networked environment of FIG. 2 according to various embodiments of the present disclosure.

With reference to FIG. 5, shown is a schematic block diagram of the computing environment 203 according to an embodiment of the present disclosure. The computing environment 203 includes one or more computing devices 500. Each computing device 500 includes at least one processor circuit, for example, having a processor 503 and a memory 506, both of which are coupled to a local interface 509. To this end, each computing device 500 may comprise, for example, at least one server computer or like device. The local interface 509 may comprise, for example, a data bus with an accompanying address/control bus or other bus structure as can be appreciated.

Stored in the memory 506 are both data and several components that are executable by the processor 503. In particular, stored in the memory 506 and executable by the processor 503 are the streaming media application 213 and potentially other applications. Also stored in the memory 506 may be a data store 209 and other data. In addition, an operating system may be stored in the memory 506 and executable by the processor 503.

It is understood that there may be other applications that are stored in the memory 506 and are executable by the processor 503 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 506 and are executable by the processor 503. In this respect, the term "executable" means a program file that is in a form that can ultimately be run by the processor 503. Examples of executable programs may be, for example, a compiled program that can be translated into machine code in a format that can be loaded into a random access portion of the memory 506 and run by the processor 503, source code that may be expressed in proper format such as object code that is capable of being loaded into a random access portion of the memory 506 and executed by the processor 503, or source code that may be interpreted by another executable program to generate instructions in a random access portion of the memory 506 to be executed by the processor 503, etc. An executable program may be stored in any portion or component of the memory 506 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 506 is defined herein as including both volatile and nonvolatile memory and data storage components. Volatile components are those that do not retain data values upon loss of power. Nonvolatile components are those that retain data upon a loss of power. Thus, the memory 506 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 503 may represent multiple processors 503 and/or multiple processor cores and the memory 506 may represent multiple memories 506 that operate in parallel processing circuits, respectively. In such a case, the local interface 509 may be an appropriate network that facilitates communication between any two of the multiple processors 503, between any processor 503 and any of the memories 506, or between any two of the memories 506, etc. The local interface 509 may comprise additional systems designed to coordinate this communication, including, for example, performing load balancing. The processor 503 may be of electrical or of some other available construction.

Although the streaming media application 213, the client application 243, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 3 and 4 show the functionality and operation of an implementation of portions of the streaming media application 213 and the client application 243. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 503 in a computer system or other system. The machine code may be converted from the source code, etc. If embodied in hardware, each block may represent a circuit or a number of interconnected circuits to implement the specified logical function(s).

Although the flowcharts of FIGS. 3 and 4 show a specific order of execution, it is understood that the order of execution may differ from that which is depicted. For example, the order of execution of two or more blocks may be scrambled relative to the order shown. Also, two or more blocks shown in succession in FIGS. 3 and 4 may be executed concurrently or with partial concurrence. Further, in some embodiments, one or more of the blocks shown in FIGS. 3 and 4 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the streaming media application 213 and the client application 243, that comprises software or code can be embodied in any non-transitory computer-readable medium for use by or in connection with an instruction execution system such as, for example, a processor 503 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the streaming media application 213 and the client application 243, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 500, or in multiple computing devices in the same computing environment 203. Additionally, it is understood that terms such as "application," "service," "system," "engine," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A method, comprising:
   receiving, by at least one computing device, a request for content from a client computing device, the request comprising a broadcast station identifier of a broadcast station within range of the client computing device, a set of media access control (MAC) addresses, a broadcast definition indicator based at least in part on a definition format, and a program identifier;
   identifying, by the at least one computing device, a program record associated with the content, the program record comprising location restriction metadata associated with the content;
   determining, by the at least one computing device, that client computing device is authorized to access the content based at least in part on the location restriction metadata and at least one of the broadcast station identifier, the set of MAC addresses, the broadcast definition indicator, or the program identifier;
   converting, by the at least one computing device, the content to a format to be streamed to the client computing device in response to determining that the client computing device is authorized to access the content; and
   streaming, by the at least one computing device, the content to the client computing device in response to determining that the client computing device is authorized to access the content.

2. The method of claim 1, wherein determining that the client computing device is authorized to access the content comprises:
   identifying, by the at least one computing device, a restricted area for the content with reference to the location restriction metadata; and
   determining, by the at least one computing device, that a location of the client computing device falls outside the restricted area.

3. The method of claim 1, further comprising:
   determining, by the at least one computing device, a broadcast area for the content based at least in part on the broadcast station identifier; and
   determining, by the at least one computing device, that the client computing device is authorized to access the content based at least in part on the location restriction metadata and the broadcast area for the content.

4. The method of claim 1, further comprising:
   determining, by the at least one computing device, a location of the client computing device based at least in part on a MAC address of a wireless network in range of the client computing device being included in the set of MAC addresses; and
   determining, by the at least one computing device, whether the client computing device is authorized to access the content based at least in part on the location restriction metadata and the MAC address of the wireless network being included in the set of MAC addresses.

5. The method of claim 1, wherein:
   the request for content further comprises global positioning system (GPS) coordinates; and
   the method further comprises determining, by the at least one computing device, that the client computing device is authorized to access the content based at least in part on the GPS coordinates.

6. The method of claim 1, further comprising:
   accessing, by the at least one computing device, a list of broadcast station identifiers associated with the content in the program record; and
   determining, by the at least one computing device, that the broadcast station identifier is included within the list of broadcast station identifiers.

7. The method of claim 1, further comprising:
   determining, by the at least one computing device, that a broadcast signal received by the client computing device comprises a standard definition signal or a high-definition signal based at least in part on the broadcast definition indicator, wherein:
   converting the content comprises converting, by the at least one computing device, the content to either a first resolution format or a second resolution format, respectively, based at least in part on the broadcast signal, the broadcast signal comprising the standard definition signal or the high-definition signal based on the broadcast definition indicator.

8. The method of claim 1, further comprising:
   sending, by the at least one computing device, an error message to the client computing device in response to determining that the client computing device is not authorized to access the content.

9. A system, comprising:
   at least one computing device comprising a processor and a memory; and
   machine readable instructions stored in the memory that, when executed by the processor, cause the at least one computing device to at least:
      receive a request for content from a client computing device, the request comprising a broadcast station identifier of a broadcast station within range of the client computing device, a set of media access control (MAC) addresses, a broadcast definition indicator based at least in part on a definition format, and a program identifier;
      identify a program record associated with the content, the program record comprising location restriction metadata associated with the content;
      determine that the client computing device is authorized to access the content based at least in part on the location restriction metadata and at least one of the broadcast station identifier, the set of MAC addresses, the broadcast definition indicator, or the program identifier;
      convert the content to a format to be streamed to the client computing device in response to determining that the client computing device is authorized to access the content; and
      stream the content to the client computing device in response to determining that the client computing device is authorized to access the content.

10. The system of claim 9, wherein the machine readable instructions, when executed by the processor, further cause the at least one computing device to at least:
   identify a restricted area for the content with reference to the location restriction metadata; and
   determine that a location of the client computing device falls outside the restricted area.

11. The system of claim 9, wherein the machine readable instructions, when executed by the processor, further cause the at least one computing device to at least:
 determine a broadcast area for the content based at least in part on the broadcast station identifier; and
 determine that the client computing device is authorized to access the content based at least in part on the location restriction metadata and the broadcast area for the content.

12. The system of claim 9,
 wherein the machine readable instructions, when executed by the processor, further cause the at least one computing device to at least:
 determine a location of the client computing device based at least in part on a MAC address of a wireless network in range of the client computing device that is included in the set of MAC addresses; and
 determine that the client computing device is authorized to access the content based at least in part on the location restriction metadata and MAC address of the wireless network being included in the set of MAC addresses.

13. The system of claim 9, wherein:
 the request for content further comprises global positioning system (GPS) coordinates; and
 the machine readable instructions, when executed by the processor, further cause the at least one computing device to at least determine that the client computing device is authorized to access the content based at least in part on the GPS coordinates.

14. The system of claim 9, wherein the machine readable instructions, when executed by the processor, further cause the at least one computing device to at least:
 access a list of broadcast station identifiers associated with the content in the program record; and
 determine that the broadcast station identifier is included within the list of broadcast station identifiers.

15. The system of claim 9, wherein the machine readable instructions, when executed by the processor, further cause the at least one computing device to at least:
 determine that a broadcast signal received by the client computing device comprises a standard definition signal or a high-definition signal based at least in part on the broadcast definition indicator; and
 convert the content to either a first resolution format or a second resolution format, respectively, based at least in part on whether the broadcast signal comprises the standard definition signal or the high-definition signal based on the broadcast definition indicator.

16. The system of claim 9, wherein the machine readable instructions, when executed by the processor, further cause the at least one computing device to at least send an error message to the client computing device in response to determining that the client computing device is not authorized to access the content.

17. A non-transitory computer-readable medium embodying a program executable in at least one computing device, the program comprising machine readable instructions that, when executed, configure the at least one computing device to at least:
 receive a request for content from a client computing device, the request comprising a broadcast station identifier of a broadcast station within range of the client computing device, a set of media access control (MAC) addresses, a broadcast definition indicator based at least in part on a definition format, and a program identifier;
 identify a program record associated with the content, the program record comprising location restriction metadata associated with the content;
 determine that the client computing device is authorized to access the content based at least in part on the location restriction metadata and at least one of the broadcast station identifier, the set of MAC addresses, the broadcast definition indicator, or the program identifier;
 convert the content to a format to be streamed to the client computing device in response to determining that the client computing device is authorized to access the content; and
 stream the content to the client computing device in response to determining that the client computing device is authorized to access the content.

18. The non-transitory computer-readable medium of claim 17, wherein the at least one computing device is further configured to:
 identify a restricted area for the content with reference to the location restriction metadata; and
 determine that a location of the client computing device falls outside the restricted area.

19. The non-transitory computer-readable medium of claim 17,
 wherein the at least one computing device is further configured to:
 determine a location of the client computing device based at least in part on a MAC address of a wireless network in range of the client computing device that is included in the set of MAC addresses; and
 determine that the client computing device is authorized to access the content based at least in part on the location restriction metadata and the location of the client computing device.

20. The non-transitory computer-readable medium of claim 17, wherein the at least one computing device is further configured to:
 determine that a broadcast signal received by the client computing device comprises a standard definition signal or a high-definition signal based at least in part on the broadcast definition indicator; and
 convert the content to either a first resolution format or a second resolution format, respectively, based at least in part on whether the broadcast signal comprises the standard definition signal or the high-definition signal based on the broadcast definition indicator.

* * * * *